(12) United States Patent
Cartner

(10) Patent No.: US 7,185,479 B1
(45) Date of Patent: Mar. 6, 2007

(54) MOWER HEAD WITH MOVABLE GUARD

(76) Inventor: Jack O. Cartner, 1005. N. 8th St., Cambridge, OH (US) 43725

( * ) Notice: Subject to any disclaimer, the term of this patent is extended or adjusted under 35 U.S.C. 154(b) by 443 days.

(21) Appl. No.: 09/587,197

(22) Filed: Jun. 5, 2000

(51) Int. Cl.
*A01D 67/00* (2006.01)

(52) U.S. Cl. ...................... 56/320.1; 56/17.4

(58) Field of Classification Search ........... 56/320.1, 56/17.5, 17.4, DIG. 20, DIG. 24
See application file for complete search history.

(56) References Cited

U.S. PATENT DOCUMENTS

| | | | | |
|---|---|---|---|---|
| 3,369,350 A | * | 2/1968 | Rogers et al. | 56/320.2 |
| 3,496,707 A | * | 2/1970 | Kobey | 56/17.5 |
| 4,107,907 A | * | 8/1978 | Rutherford | 56/320.2 |
| 4,282,704 A | * | 8/1981 | Stevens | 56/320.1 |
| 4,378,668 A | * | 4/1983 | Gullett | 56/12.7 |
| 4,445,312 A | | 5/1984 | Cartner | |
| 4,738,091 A | * | 4/1988 | Kulak et al. | 56/320.2 |
| 4,986,010 A | | 1/1991 | Cartner | |
| 5,003,757 A | | 4/1991 | Hill | |
| 5,005,344 A | * | 4/1991 | McCracken | 56/14.7 |
| 5,392,593 A | | 2/1995 | Emery | |
| 5,657,620 A | | 8/1997 | Thagard et al. | |
| 5,685,136 A | | 11/1997 | Aron | |
| 5,765,348 A | | 6/1998 | Thagard et al. | |
| 5,826,417 A | | 10/1998 | Evans | |
| 6,048,275 A | * | 4/2000 | Gedeon | 473/293 |

OTHER PUBLICATIONS

MoTrim Boom Chopper Brochure, Sep. 1998.
MoTrim Boom Mower Brochure, Nov. 1996.
Alamo Industrial Machete® Brochure, Apr. 1997.
Tiger Boom Mowers Brochure, Jan. 1996.

* cited by examiner

*Primary Examiner*—Thomas B. Will
*Assistant Examiner*—Alicia Torres
(74) *Attorney, Agent, or Firm*—Fay, Sharpe, Fagan, Minnich & McKee, LLP

(57) ABSTRACT

A mower head has a deck with at least three sides and at least one side wall depending from the deck. A cutting blade is rotatably mounted to the deck on an axis extending through the deck. The deck is disposed above and generally parallel to the blade. A guard assembly includes an actuating member mounted on the deck. The guard is attached to the actuating member and pivotally attached to the deck via a hinge along two sides of the deck. A flap depends from the guard. A flap also depends from one of the three sides of said deck. A top surface of the guard and a top surface of the deck can be located in the same plane. In a second embodiment, the guard includes a first wall having a plurality of angled sections which matingly interconnect with angled sections of one of the deck sides. In a third embodiment, the top surface of the guard and the top surface of the deck are located in different planes.

26 Claims, 7 Drawing Sheets

FIG. 3A

MOWER HEAD WITH MOVABLE GUARD

BACKGROUND OF THE INVENTION

The present invention relates to a mower head. More particularly, the present invention relates to a mower head with a movable guard.

The invention finds particular application in conjunction with rotary brush and grass mowing and cutting apparatus for trimming highway medians and shoulders and will be described with particular reference thereto. It is to be appreciated, however, that the invention has other applications including clearing saplings, small trees, brush, grass, and the like.

Heretofore, mowing heads have been mounted to tractors and other prime movers with various constructions including articulated arm assemblies and side arm assemblies. The mower heads commonly include one or a plurality of rotating cutting blades which are housed within a shield structure. The shield typically includes an upper deck and a skirt which extends from the upper deck below the rotary cutting blades along all but the forward side of the mower head. Various structures have been developed to allow grass and brush to pass under the forward side of the mower head into the path of the cutting blade but to inhibit other items such as the limbs of the operator from passing into the path of the cutting blade. Such structures include a plurality of rake-like projections, a plurality of short lengths of chain, and the like.

Guarding the blades on a rotary cutter has always been a major problem. This is especially true when the cutter is attached to an extendible arm.

Since it is not practical to build the carrier and boom arm of sufficient strength to push trees, etc. over so that they can be cut, various configurations of detachable and hinge-type guards have been developed. Displacing the guard (the front portion of a mower housing) allows the operator to get the cutting blade close to the tree or brush to be cut in a manner similar to the way a skill saw or bench grinder functions.

Removing a straight front section of a rectangular or square mower housing, which acts as a guard, did not prove to be adequate. This construction provides a very limited cutting swath for the blades. Therefore, guards evolved whereby the front section of the mower housing would retract out of the way. This construction was disadvantageous because no shield extended downwardly to prevent the blades from throwing foreign objects when the guard is in its normal position.

Another problem with the prior art mower heads is that it is difficult to pass heavier brush and saplings below the shield into the cutting blade. Frequently, the mower heads are mounted with a breakaway mounting to enable them to yield upon encountering a stationary object, such as a fence post. The breakaway mounting tends to inhibit the operator from urging the mower head against the heavier brush and saplings with progressively a greater force until they yield and pass into the cutting blade.

Brush clearing devices commonly have exposed, rotary cutting blades. In areas along roadways and the like such devices are disadvantageous because people may be harmed by the cutting blade or objects thrown by the blade.

Accordingly, it is desirable to develop a new and improved mower head with a movable guard which would overcome the foregoing deficiencies and others while meeting the above-stated needs and providing better and more advantageous overall results.

SUMMARY OF THE INVENTION

The present invention relates to a new and improved mower head with a movable guard. More specifically, the mower head comprises a deck having at least three sides and at least one side wall depending from the deck. At least one cutting blade is rotatably mounted to the deck on an axis extending through the deck. The deck is disposed above and generally parallel to the blade. The deck further comprises a flap depending from one of the sides of the deck. Two of the deck sides are normal to each other and a third of the deck sides is positioned at an acute angle in relation to the other two deck sides.

A guard assembly comprises an actuating member mounted on the deck, a guard attached to the pivotable arm and pivotally attached via a hinge to the deck along two sides of the deck, and a flap which depends from the guard. The guard includes a first wall which comprises an approximately straight edge and a second wall which comprises a plurality of angled sections.

The actuating member comprises a hydraulic cylinder and a piston. The cylinder includes a chamber surrounding the piston. The actuating member is mounted on the deck at a location spaced from the hinge.

A top surface of the guard and a top surface of the deck are located in the same plane.

In a second preferred embodiment, one of the deck sides can comprise a plurality of angled sections.

The guard has one wall comprising a plurality of angled sections which matingly interconnect with the angled sections of the deck side and a second wall which comprises a plurality of angled sections.

The mower head can further comprise a fourth side and at least three side walls, one depending from three of the four sides. Two of the side walls are rigid. A third side wall comprises a flap depending from one side of the deck.

In a third preferred embodiment, the top surface of the guard and the top surface of the deck are located in different planes.

One advantage of the present invention is the provision of a new and improved mower head.

Another advantage of the present invention is the provision of a mower head with a guard which is pivotably attached to the deck and provides protection for a cutting blade of the mower head.

Still another advantage of the present invention is the provision of a mower head with a guard pivotably attached by a hinge at an angle with respect to two other sides of the deck of the mower head to allow more of the blade to be exposed and allow easier access to trees, shrubs, etc. for cutting.

Yet another advantage of the present invention is the provision of a mower head with a flap extending from the guard to protect the cutting blade when the guard is in its normal down position.

A further advantage of the present invention is the provision of a mower head with a guard which can be installed either in front of an angled main deck or above the main deck. If it is installed above the mower main deck, the front end of the main deck can be varied in shape.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Figure 3A:
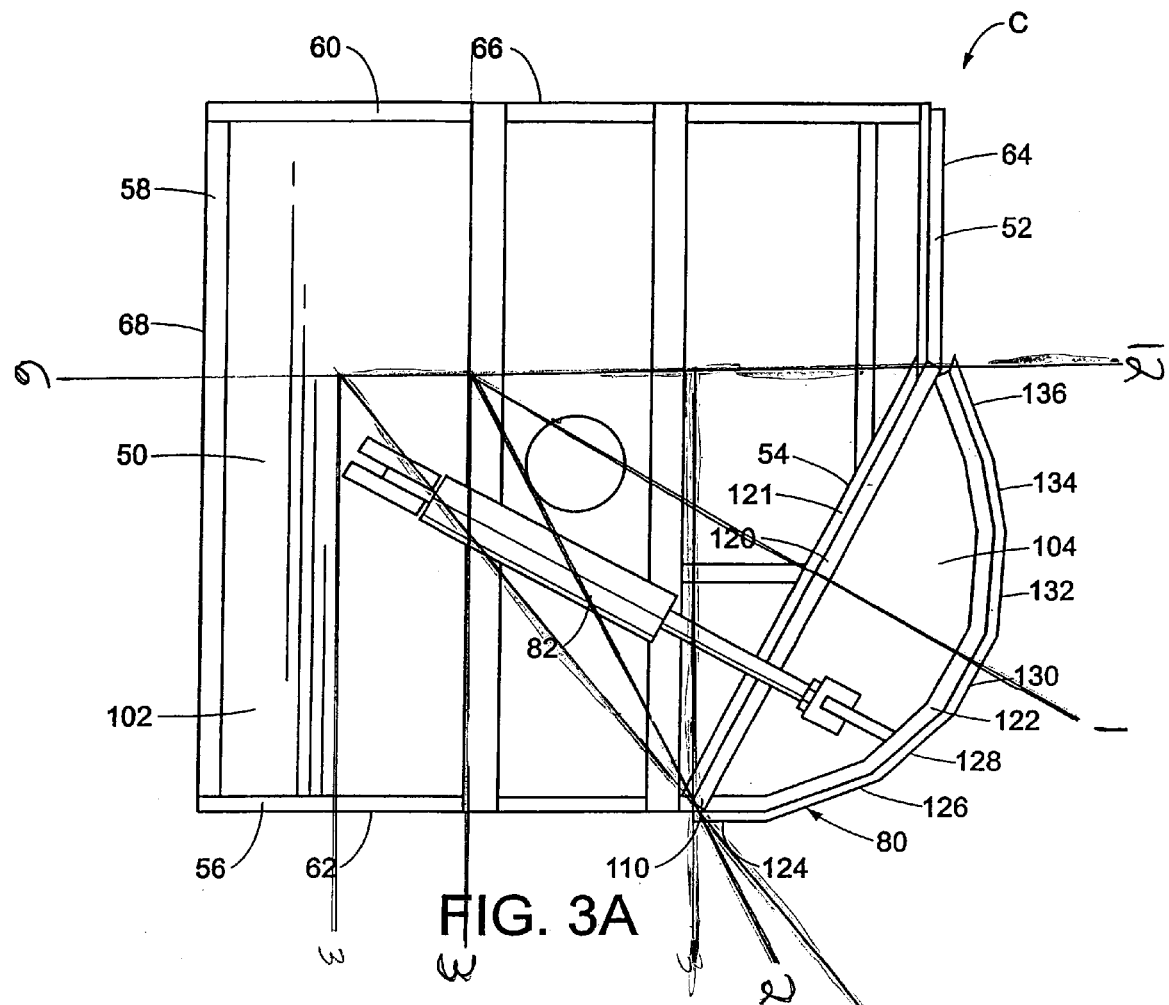
FIG. 3A is a top plan view of the mower head with a movable guard according to a first preferred embodiment of the present invention.

Referring now to the drawings, wherein the showings are for purposes of illustrating preferred embodiments of this invention only and not for purposes of limiting same, FIG. 3A shows a mower head C according to a first preferred embodiment of the present invention.

A mower includes a prime mover, such as a tractor (not shown), which is self-propelled to move at least in forward and rearward directions. An arm assembly (not shown) is operatively connected at one end with the prime mover and at the other end with the mower head. A positioning control means, such as a plurality of hydraulic cylinders, controls the position of the arm assembly relative to the prime mover and the mower head. In this manner, the position and orientation of the head is selectively variable. The arm assembly can be a boom assembly which includes at least two pivotally connected arms, one of which is pivotally connected with the prime mover and the other of which is pivotally connected with the mower head.

Figure 1A:
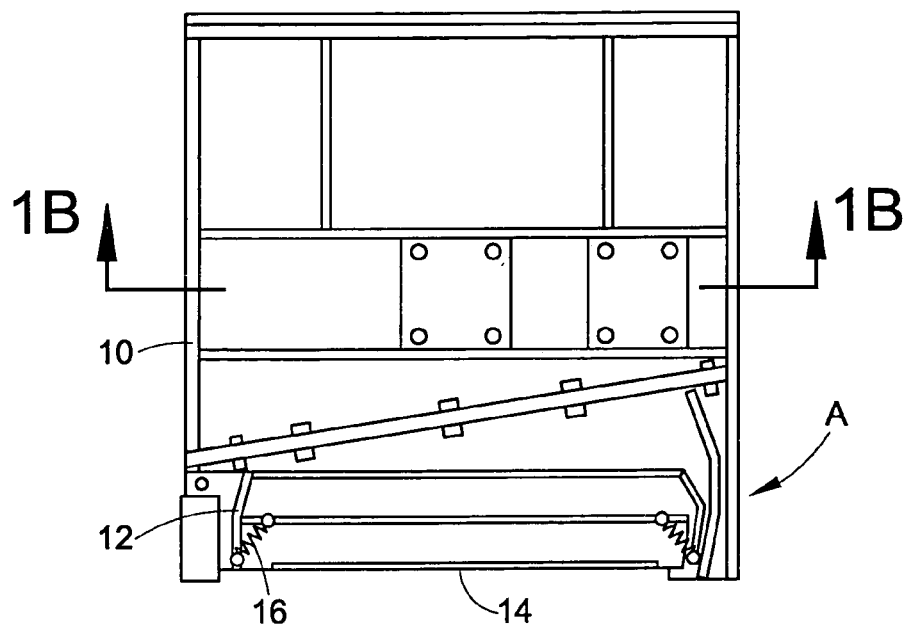
FIG. 1A is a top plan view of a prior art mower head with a movable guard.
Figure 1B:
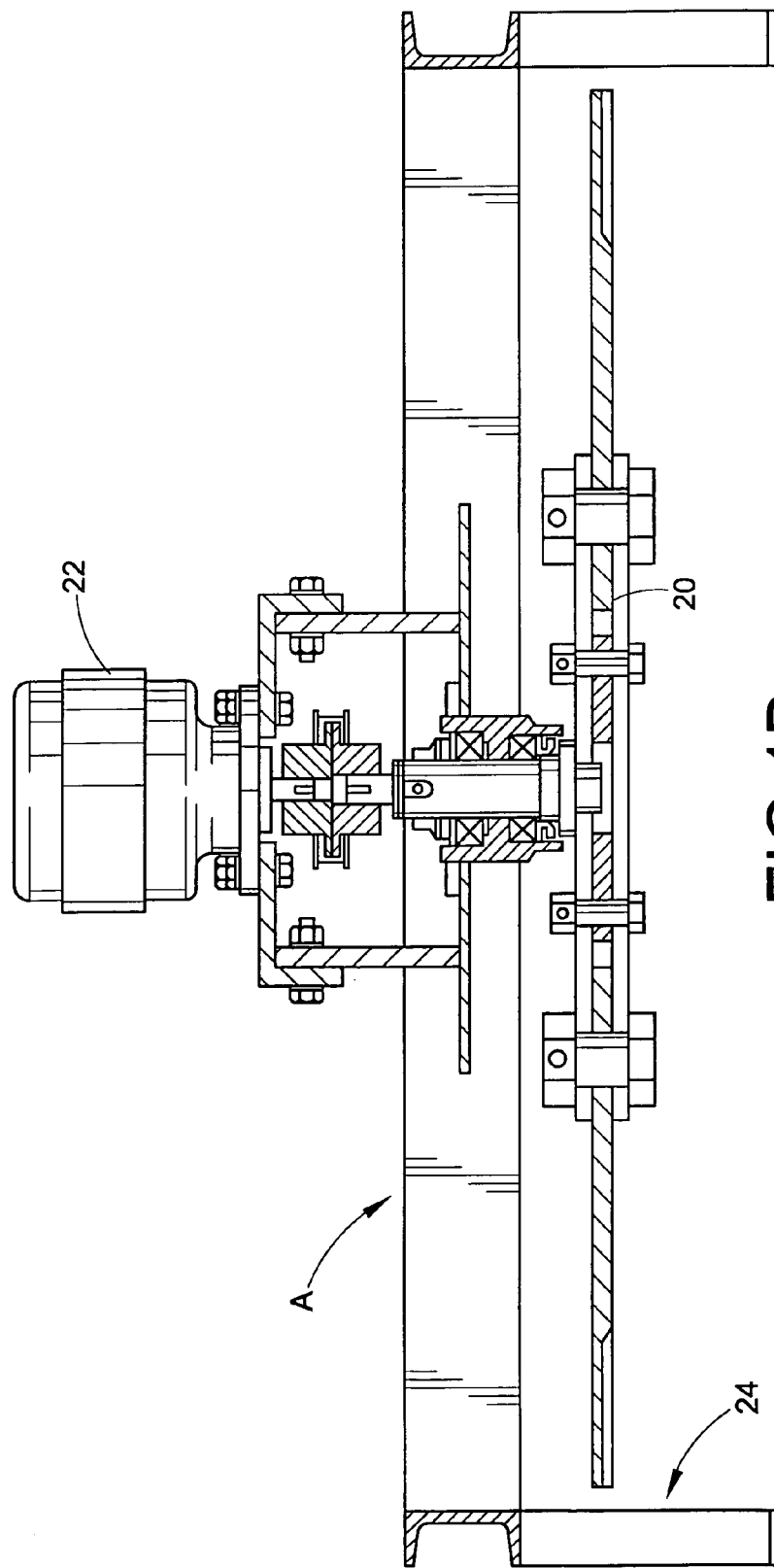
FIG. 1B is a side elevational view of the prior art mower head with a movable guard of FIG. 1A.

As shown in FIGS. 1A and 1B, one known guard system A (U.S. Pat. No. 4,445,312) comprises a deck 10, with a guard 12 with a front surface 14 which is spring loaded by spring 16. A blade 20 is positioned below the deck and is mounted to a motor 22, via an axis extending through the deck. An opening 24 exposes the blade when the guard swings out of the way, against the bias of the springs pulling it into its down position. Another known design replaces the springs with a hydraulic actuation system. While both of these constructions allow the blades to be exposed in the front for cutting purposes, they provide a very limited cutting swath for the blades.

Figure 2A:
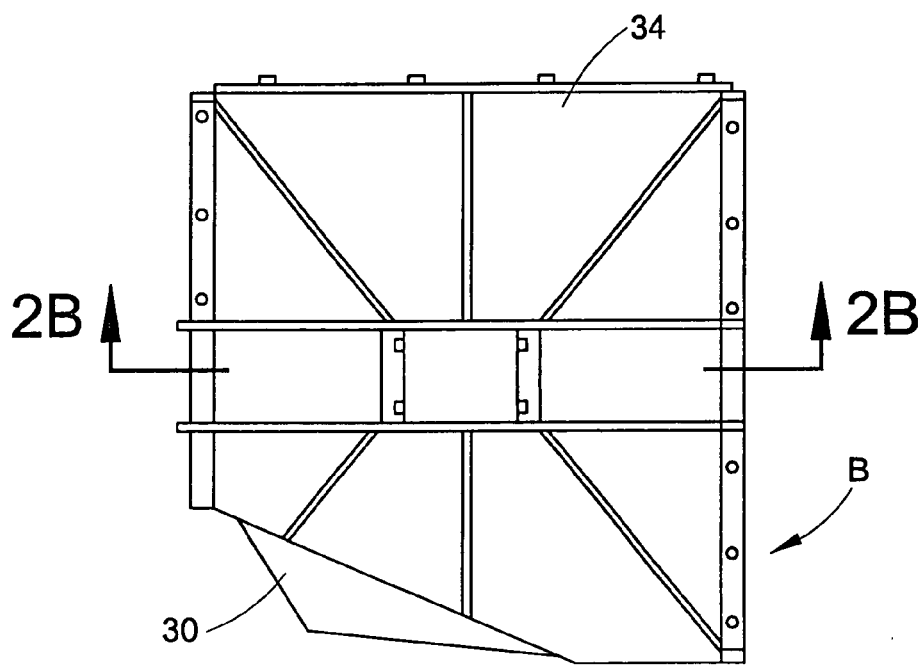
FIG. 2A is a top plan view of a second prior art mower head with a movable guard.
Figure 2B:
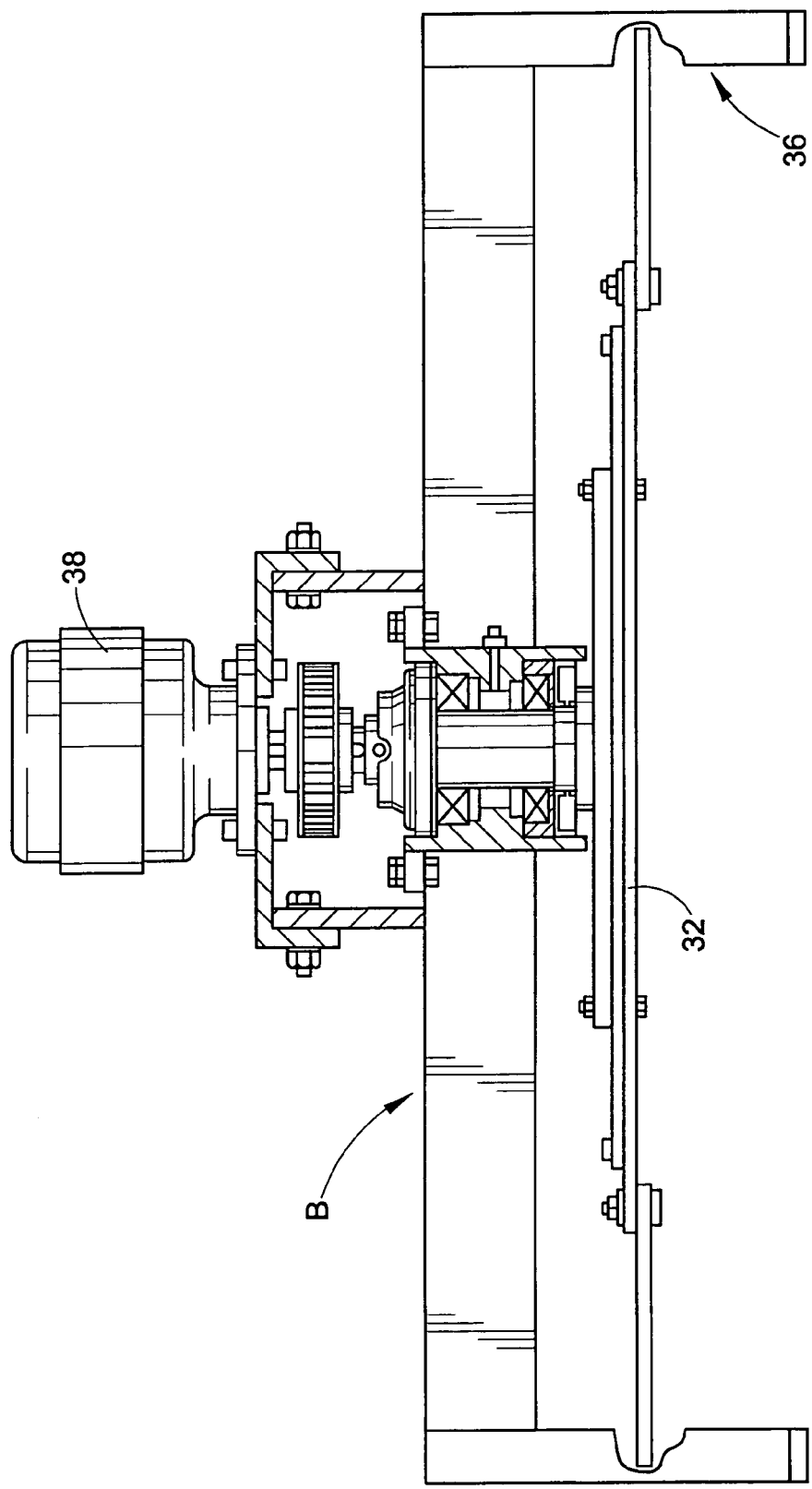
FIG. 2B is a side elevational view of the prior art mower head with movable guard of FIG. 2A.

Another popular type of guard is a swinging guard. Referring to FIGS. 2A and 2B, the swinging guard system B has a guard 30 which swings rearward above blades 32 and below a mower deck 34, and it allows the cutter blades to contact the material to be cut through an opening 36. The blades 32 are drivingly connected to a motor 38. However, when the guard B is in the closed or forward position, there is nothing extending downward in a vertical direction to prevent the blades from throwing foreign objects.

Figure 3B:
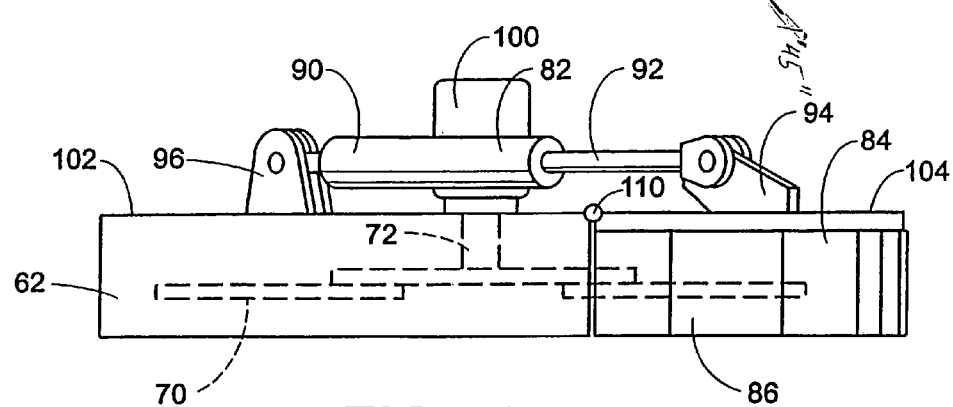
FIG. 3B is a side elevational view of the mower head of FIG. 3A.

Referring to FIGS. 3A and 3B, the mower head C according to the present invention comprises a polygonal deck 50 having sides 52, 54, 56, 58, and 60. The deck can be fabricated from metal. Side 54 is positioned at an acute angle with respect to sides 52 and 56. Sides 52 and 60 are oriented approximately normal to each other. Similarly, side 58 is positioned approximately normal to each of sides 56 and 60.

Side walls depend from each side of the deck. More specifically, side wall 62 depends from side 56, side wall 64 depends from side 52, side wall 66 depends from side 60, and side wall 68 depends from side 58. In this embodiment, side walls 62, 66, and 68 are rigid. However, side wall 64 comprises a flap which is flexible and moves out of the way when cutting is performed. The flap can be made from rubber, cloth, or any other flexible material. It can also be comprised of short metal chains or another movable type of material.

A cutting blade 70 is rotatably mounted to the deck 50 on an axis 72 which extends through the deck. The deck 50 is disposed above and generally parallel to the blade 70.

A guard assembly 80 is attached to the mower head. The guard assembly comprises an actuating member 82 mounted on the deck 50. A guard 84 is pivotally attached to the deck along sides 52, 54 of the deck. A flap 86 which depends from the guard 84 extends in front of the blade 70.

The actuating member 82 can comprise a hydraulic cylinder 90 and a piston 92. The actuating member 82 is pivotally attached at its piston rod end to a flange 94 which is rigidly mounted to the guard 84. The actuating member 82 is pivotally attached at its cylinder end to a flange 96 which is rigidly mounted to the deck 50.

A motor 100, which can be a hydraulic motor, is drivingly connected to the cutting blade 70 through axis 72. The motor 100 is positioned on a top surface 102 of the deck 50. The motor 100 is connected with a source of fluid power by hydraulic lines (not shown) extending along an arm connected to the prime mover.

The guard 84 has a top surface 104 which, in this embodiment, is located in the same plane as the top surface 102 of the deck 50. A hinge 110 pivotally mounts the guard 84 to the deck 50. The guard 84 includes a first wall 120 which comprises an approximately straight edge 121 and a second wall 122 which comprises a plurality of angled sections 124, 126, 128, 130, 132, 134, 136.

Figure 6:
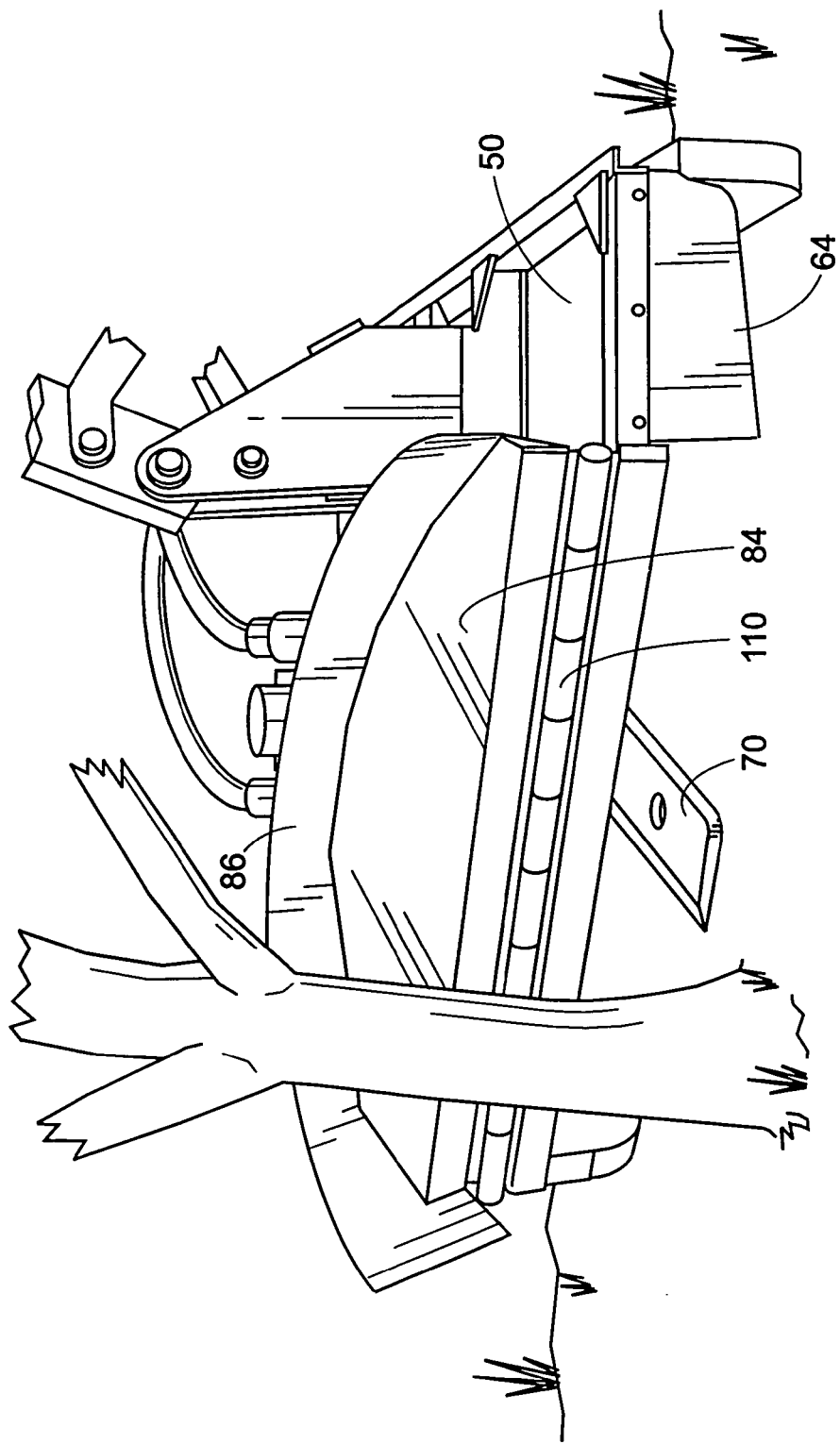
FIG. 6 is a perspective view of the mower head with the guard in the open position according to the first preferred embodiment of the present invention.

In operation, the guard is lifted out of cutting path of the mower head through a pivoting motion along the hinge 110 by the actuating member 82. The guard is lifted at an angle with respect to the path of travel of the deck and is pulled toward the center of the deck, as shown in FIG. 6. The blade then extends beyond the side walls of the deck through an opening, as shown in FIG. 6, and is able to cut trees, shrubs and the like.

Figure 4A:
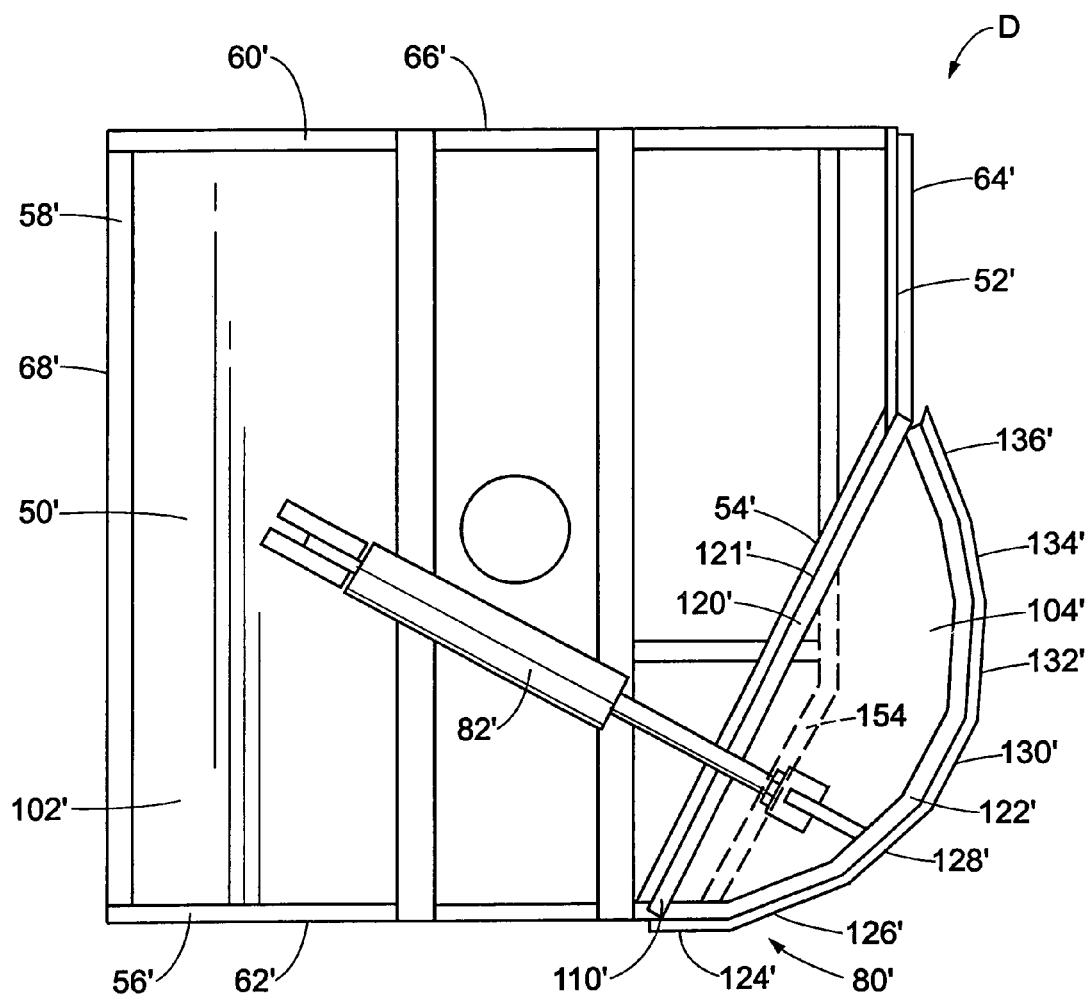
FIG. 4A is a top plan view of the mower head with a movable guard according to a second preferred embodiment of the present invention.
Figure 4B:
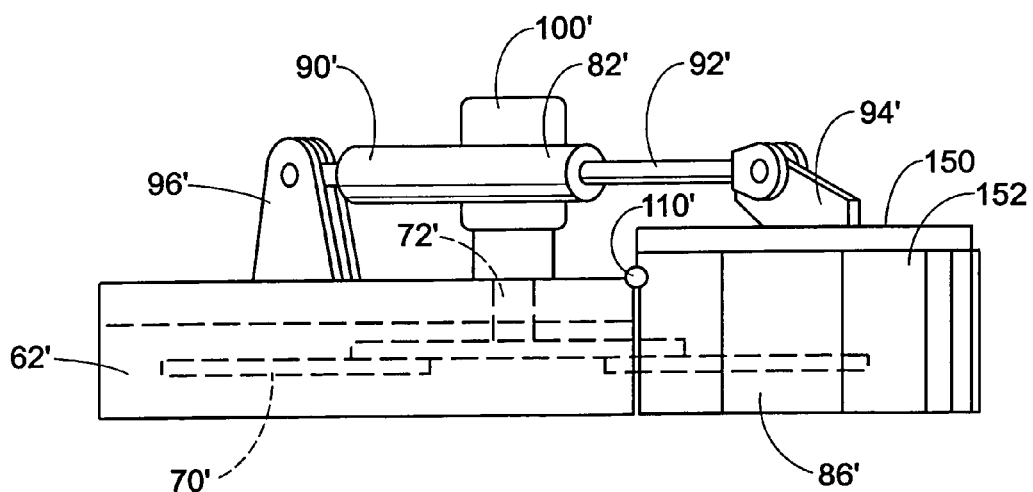
FIG. 4B is a side elevational view of the mower head of FIG. 4A.

Referring now to FIGS. 4A and 4B, a second preferred embodiment of the mower head is shown. In this embodiment, like elements with the embodiment of FIGS. 3A and 3B are denoted by like reference numerals with a primed (') suffix and new components are identified by new numerals. The mower head D of FIGS. 4A and 4B has the same features as the head shown in FIGS. 3A and 3B except that a top surface 150 of a guard 152 is located in a different plane from a top surface 102' of a deck 50'. This allows a side 54' of the deck adjacent the guard 152 to vary in shape with respect to the guard. Thus, side 54' can have an extension 154 protruding under the guard 152 and over a blade 70' thus covering more of the blade when the guard 152 is in the open position.

Figure 5A:
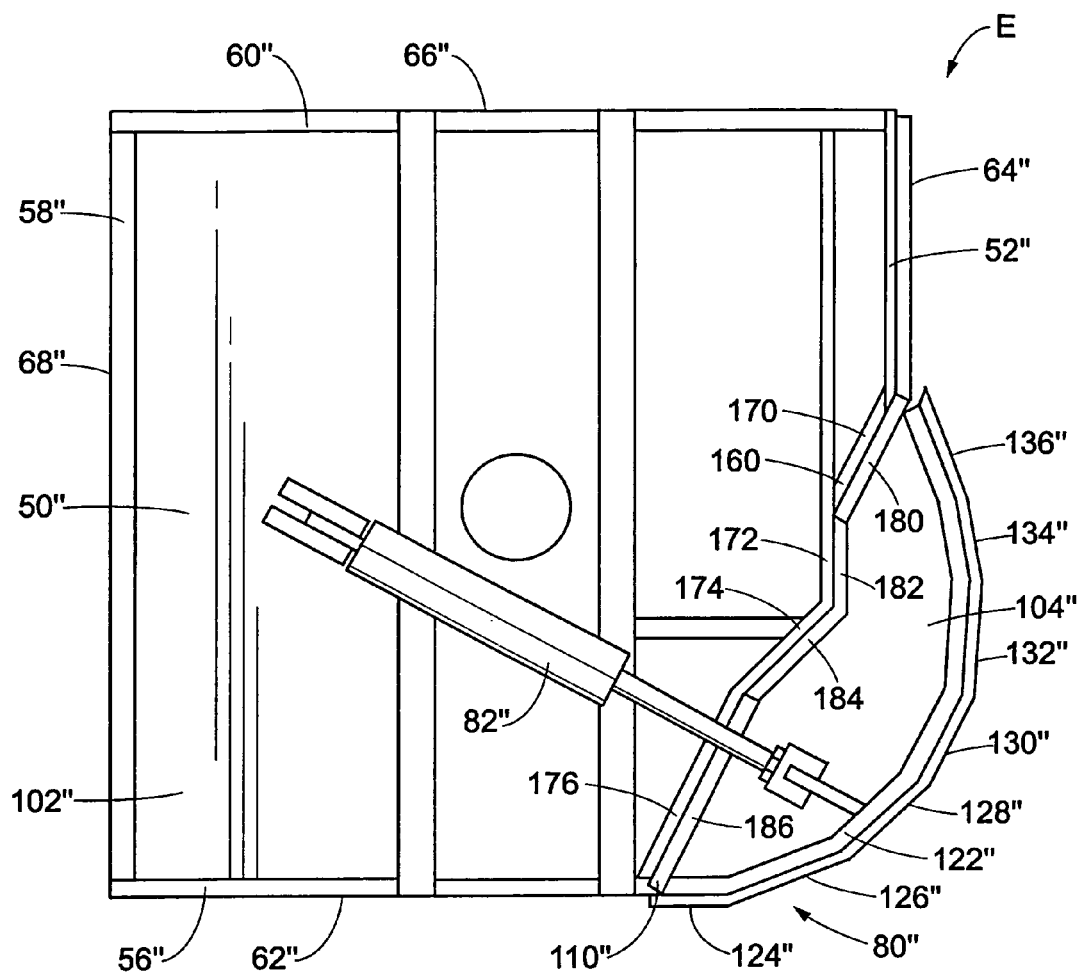
FIG. 5A is a top plan view of the mower head with a movable guard according to a third preferred embodiment of the present invention.
Figure 5B:
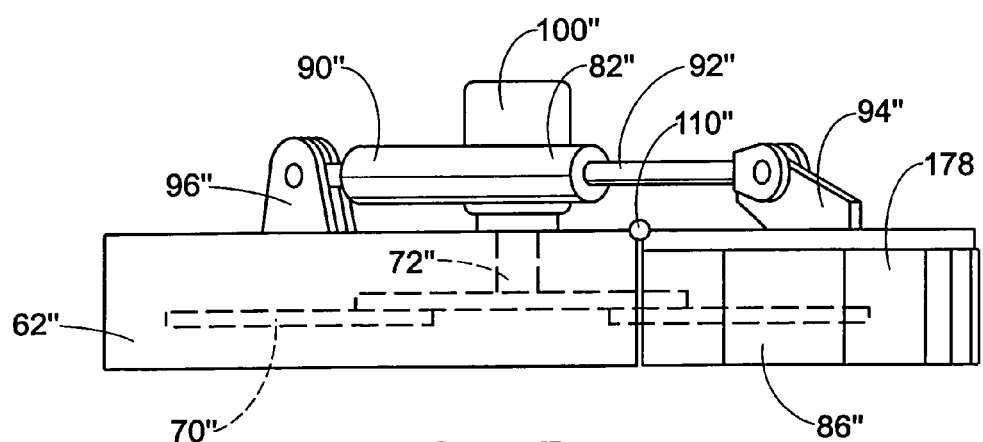
FIG. 5B is a side elevational view of the mower head of FIG. 5A.

Referring now to FIGS. 5A and 5B, a third preferred embodiment of the mower head is shown. In this embodiment, like elements with the embodiment of FIGS. 3A and 3B are denoted by like reference numerals with a double primed (") suffix and new components are identified by new numerals. The mower head E of FIGS. 5A and 5B has the same features as the head of FIGS. 3A and 3B except a side 160 of a deck 50" has a plurality of angled sections 170, 172, 174, 176. A guard 178 also has a plurality of angled sections 180, 182, 184, 186 which matingly interconnect with the angled sections 170, 172, 174, 176 of the deck side 160. The angled portions of the deck side 160 protrude further over the top of the blade. This construction is advantageous because it provides additional shielding of the blade, as well as preventing debris from flying up from the blade during cutting.

The invention has been described with reference to the preferred embodiments. Obviously, alterations and modifications will occur to others upon a reading and understanding of this specification. It is intended to include all such modifications and alterations insofar as they come within the scope of the appended claims or the equivalents thereof.

What is claimed is:

1. A mower head comprising:
   a deck comprising:
      at least four sides and four corners, and
      three side walls, one depending from each of three of said at least four sides, wherein two of said three side walls are rigid;
   at least one cutting blade rotatably mounted to said deck on an axis extending through said deck, said deck being disposed above and generally parallel to said blade; and
   a guard assembly comprising:
      a hinge mounted to and extending at an angle in relation to two adjacent ones of said at least four sides of said deck,
      a guard pivotally attached to said deck via said hinge, and
      said guard including a plurality of discretely angled sections which angled sections together form a single corner of said deck.

2. The mower head of claim 1, further comprising an actuating member mounted on said deck.

3. The mower head of claim 2 wherein said actuating member comprises a hydraulic cylinder and a piston assembly.

4. The mower head of claim 1, further comprising a flap which depends from said guard and is movable in relation to said guard.

5. The mower head of claim 4, wherein said flap is oriented in a plane spaced apart from a plane of said guard.

6. The mower head of claim 4, wherein said flap is a resilient, one-piece flap.

7. A mower head comprising:
   a deck having at least four sides including a front side;
   a boom arm to which said deck is mounted, said boom arm being positioned adjacent a first side edge of said mower head;
   a guard assembly comprising:
      a hinge extending at an angle between said front side and an adjacent one of said sides of said deck; and
      a guard pivotally attached to said deck via said hinge, said guard being positioned adjacent a second side edge of said mower head, said second side edge being located opposite said first side edge.

8. The mower head of claim 7 further comprising an actuating member mounted on said deck.

9. The mower head of claim 8 wherein said actuating member comprises a hydraulic cylinder and a piston.

10. The mower head of claim 7 further comprising a flap which depends from said guard.

11. The mower head of claim 7 further comprising a side wall which depends from said deck front side.

12. The mower head of claim 7 wherein said guard comprises a plurality of discretely angled sections.

13. A mower head comprising:
   a deck having four sides;
   at least one cutting blade rotatably mounted to said deck on an axis extending through said deck, said deck being disposed above and generally parallel to said blade;
   a guard assembly comprising a guard pivotally attached to said deck via a hinge which extends between two adjacent ones of said four sides of said deck such that said guard is positioned in a first corner of said deck; and said guard being selectively pivotable to a position above a plane of said deck; and
   wherein said deck comprises a second corner, located adjacent said guard assembly, said second corner comprising two side walls which are rigid and non-moving, wherein a first side of said deck includes both said first corner and said second corner.

14. The mower head of claim 13 further comprising an actuating member mounted on said deck.

15. The mower head of claim 14 wherein said actuating member comprises a hydraulic cylinder and a piston.

16. The mower head of claim 13 further comprising a flap which depends from said guard.

17. The mower head of claim 13 further comprising a side wall which depends from said deck first side.

18. The mower head of claim 13 wherein said guard comprises a plurality of discretely angled sections.

19. A mower head comprising:
   a deck comprising at least four sides and including a front side;
   at least one cutting blade rotatably mounted to said deck;
   a guard assembly comprising:
      a hinge extending at an angle between said front side and an adjacent side of said deck;
      a guard pivotally attached to said deck via said hinge, said guard forming a first front corner of said deck, said guard being selectively pivotable to a position above a plane of said deck; and
   wherein said deck comprises a second front corner which is non-movable in relation to said deck, said second front corner being defined by said front side and an adjacent side of said deck.

20. The mower head of claim 19 wherein one of said at least three sides comprises a plurality of angled sections.

21. The mower head of claim 19 wherein said deck further comprises a fourth side and at least three side walls, one depending from at least three of said four sides, wherein two of said at least three side walls are rigid.

22. The mower head of claim 19 wherein one of said at least three sides further comprises an extension which protrudes under said guard.

23. The mower head of claim 19, further comprising an actuating member mounted on said deck.

24. The mower head of claim 23 wherein said actuating member comprises a hydraulic cylinder and a piston, said cylinder including a chamber surrounding said piston.

25. The mower head of claim 19, further comprising a flap which depends from said guard.

26. The mower head of claim 25, wherein said flap is a resilient, one-piece flap.

* * * * *